United States Patent
Zanger et al.

(10) Patent No.: US 8,417,794 B2
(45) Date of Patent: Apr. 9, 2013

(54) TRANSFERRING MULTIMEDIA CONTENT

(75) Inventors: Yoel Moshe Zanger, Tel-Aviv (IL); Gil Matan Gat, Tel-Aviv (IL); Boris Malamud, Rishon-Lezion (IL); Alon Diamant, Tel-Aviv (IL); Dvir Volk, Tel-Aviv (IL)

(73) Assignee: Giraffic Technologies Ltd., Tel Aviv (IL)

( * ) Notice: Subject to any disclaimer, the term of this patent is extended or adjusted under 35 U.S.C. 154(b) by 328 days.

(21) Appl. No.: 12/509,616

(22) Filed: Jul. 27, 2009

(65) Prior Publication Data

US 2011/0022682 A1 Jan. 27, 2011

(51) Int. Cl.
*G06F 15/16* (2006.01)
(52) U.S. Cl.
USPC .......................................... 709/219; 370/242
(58) Field of Classification Search .................. 709/219; 370/242
See application file for complete search history.

(56) References Cited

U.S. PATENT DOCUMENTS 7,808,918 B2 * 10/2010 Bugenhagen ................. 370/242
8,099,511 B1 * 1/2012 Ganesan et al. ............... 709/231

* cited by examiner

*Primary Examiner* — Adnan Mirza
(74) *Attorney, Agent, or Firm* — Manelli Selter PLLC; Edward J. Stemberger

(57) ABSTRACT

A computer implemented method of transferring multimedia content from a content server to a receiving client, comprising: receiving the multimedia content from the content server; processing the multimedia content according to predefined redundancy parameters; receiving a downloading request for the multimedia content from the receiving client; sending the multimedia content to the file servers; reporting a plurality of file servers with respective uploading bit rates; the client receiving a bandwidth allocation; the receiving client calculating a downloading scheme; and the receiving client downloading content in packets from the file servers and verifying the integrity and authenticity of every processed frame (group of packets) obtained from file servers. The method enhances streaming effectivity by using a robust seeding procedure.

20 Claims, 4 Drawing Sheets

TRANSFERRING MULTIMEDIA CONTENT

BACKGROUND

1. Technical Field

The present invention relates to the field of communications, and more particularly, to transferring content via multiple nodes in a communication network.

2. Discussion of Related Art

Delivering high quality video from multiple sources is a challenge to any system. It requires the availability of the required data in many data sources, coordinating these sources while handling considerable packet loss and preventing congestion. These challenges increase when the sources themselves can be unreliable, such as Peer-to-Peer agents installed on end-users' computers.

The existing methods that try to solve this problem mainly rely on the overall availability of any data file required for streaming on a very large number of nodes and in many overall copies in the network (e.g., BitTorrent). Additionally, such methods usually ignore the particular features of the video file and treat it as just another file or use a server side control to adjust the streaming (http streaming).

The term "frame" as used herein in this application, is defined as a part of a transmission stream comprising a group of packets.

BRIEF SUMMARY

Embodiments of the present invention provide a data processing system for transferring multimedia content from a content server to a receiving client, comprising: a management server; a bandwidth manager associated with the receiving client; and a plurality of file servers, each with an associated bandwidth manager. The content server, the management server, the receiving client and the plurality of file servers are connected via at least one communication link. The management server is arranged to report a plurality of file servers with respective uploading bit rates. The bandwidth managers are arranged to allocate bandwidths at file servers to the receiving client in relation to the reported file servers with respective uploading bit rates. The receiving client is arranged to calculate a downloading scheme; download the multimedia content in packets from the file servers; and verify the integrity and authenticity of every processed frame obtained from the file servers. The downloading scheme comprises a set of network paths to the file servers and corresponding bandwidths and priorities.

Accordingly, according to an aspect of the present invention, there is provided a data processing system, wherein the management server is further arranged to receive the multimedia content from the content server; process the multimedia content according to predefined redundancy parameters; receive a downloading request for the multimedia content from the receiving client; and send the multimedia content to the file servers.

Embodiments of the present invention provide a computer implemented method of transferring multimedia content from a content server to a receiving client, comprising: receiving a downloading request for the multimedia content from the receiving client; reporting a plurality of file servers with respective uploading bit rates; the client receiving a bandwidth allocation; the receiving client calculating a downloading scheme, the downloading scheme comprising a set of network paths to the file servers and corresponding bandwidths and priorities; and the receiving client downloading content in packets from the file servers and verifying the integrity and authenticity of every processed frame obtained from file servers.

Accordingly, according to an aspect of the present invention, there is provided a computer implemented method, wherein the client downloading content in packets from the file servers comprising: sending a request to the plurality of file servers that satisfy the bandwidth allocation; sending messages to the file servers with designated parts of the content; each file server checking for the content specified in the request and for available bandwidth, thereupon starting uploading; the file server sending the client an expected downloading scheme; monitoring the partial content received from each file server; notifying the file servers of received partial content and of required partial content; and notifying the file servers of bandwidth limitations and coordinating of further downloading. These, additional, and/or other aspects and/or advantages of the present invention are: set forth in the detailed description which follows; possibly inferable from the detailed description; and/or learnable by practice of the present invention.

Accordingly, according to another aspect of the present invention, there is provided a computer implemented method, further comprising: receiving the multimedia content from the content server; processing the multimedia content according to predefined redundancy parameters; and sending the multimedia content to the file servers.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
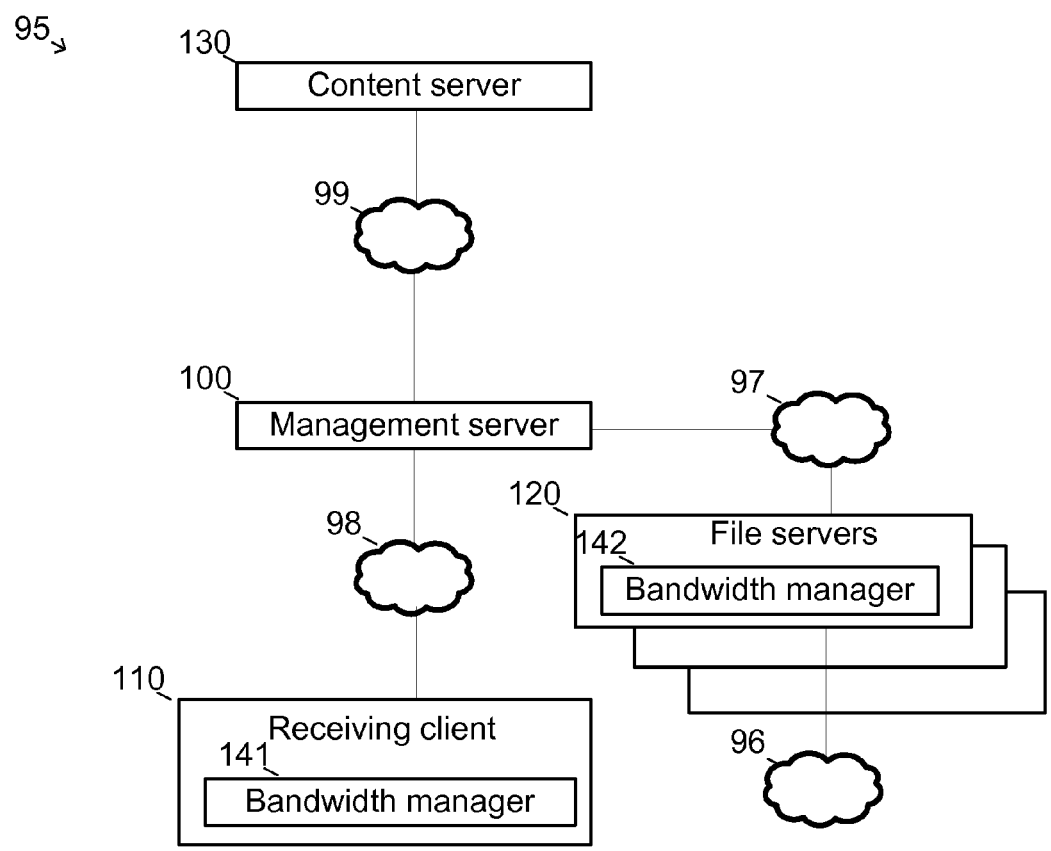
FIG. 1 is a high level schematic block diagram of a data processing system for transferring multimedia content comprising frames from a content server to a receiving client, according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

For a better understanding of the invention, the usages of the term "network path" in the present disclosure is defined in a non-limiting manner as a group of network nodes, their locations and related information. The term "network path" includes IP routes but is not limited to them, as the term is applicable to a wide range of network types. The network nodes may comprise any network components.

FIG. 1 is a high level schematic block diagram of a data processing system 95 for transferring multimedia content comprising frames from a content server 130 to a receiving client 110, according to some embodiments of the invention. Data processing system 95 comprises: a management server 100; a plurality of file servers 120; and a plurality of bandwidth managers 141, 142, each residing in each receiving client 110 (bandwidth manager 141) or file server 120 (bandwidth managers 142), that are connected with each other via communication links 96, 97, 98 and 99. Content server 130 may transfer the multimedia content via communication link 99 to management server 100, management server 100 may transfer the multimedia content via communication link 97 to file servers 120 (seeding), management server 100 and receiving client 110 may coordinate available bandwidth with bandwidth manager 141 via communication link 98, and file servers 120 may transfer the multimedia content via communication link 97 to receiving client 110.

Management server 100 may be arranged to: receive the multimedia content from content server 130; process the multimedia content according to predefined redundancy parameters; receive a downloading request for the multimedia content from receiving client 110; send the multimedia content to file servers 120; and report a plurality of file servers 120 with respective uploading bit rates.

Bandwidth manager may be arranged to allocate a bandwidth to receiving client 110 in relation to reported file servers 120 with their respective uploading bit rates. Receiving client 110 may be arranged (e.g., via an embedded application) to: calculate a downloading scheme (e.g., by selecting a sub set of the reported file servers 120 according to their respective uploading bit rates) based on data it receives from management server 100 comprising a set of network paths to the file servers and corresponding bandwidths and priorities; download the multimedia content in packets from file servers 120; and verify the integrity and authenticity of every frame (group of packets) one of file servers 120.

Receiving client 110 may be arranged to send a request to file servers 120 that satisfy the bandwidth allocation with designated parts of the content, wherein each file server 120 may be arranged to check for the content specified in the request and for available bandwidth. File servers 120 are arranged to start uploading content upon the check and to send to receiving client 110 an expected downloading scheme. Receiving client 110 may be further arranged to: monitor the partial content received from each file server 120; notify file servers 120 of received content statistics (e.g., packet loss); and notify file servers 120 of bandwidth limitations and coordinate further downloading.

According to some embodiments of the invention, bandwidth manager 141 is further arranged to re-calculate the downloading scheme according to the monitored partial content.

According to some embodiments of the invention, bandwidth managers 142 are arranged to calculate a packet loss rate from the notified received partial content and to adjust the number of packets and the predefined temporal pattern accordingly.

According to some embodiments of the invention, each file server 120 may be further arranged to divide each frame into a plurality of packets and to send the packets in a predefined temporal pattern to receiving client 110.

According to some embodiments of the invention, bandwidth manager 141 is further arranged to report each file server 120 of received packets and of missing packets from the corresponding file server 120, from other file servers 120, or various accumulations of packets (e.g., in respect to frames, to necessary content, or in relation to temporal constraints of keeping a continuous streaming).

According to some embodiments of the invention, data processing system 95 enhances streaming effectivity by using a robust seeding procedure.

Figure 2:
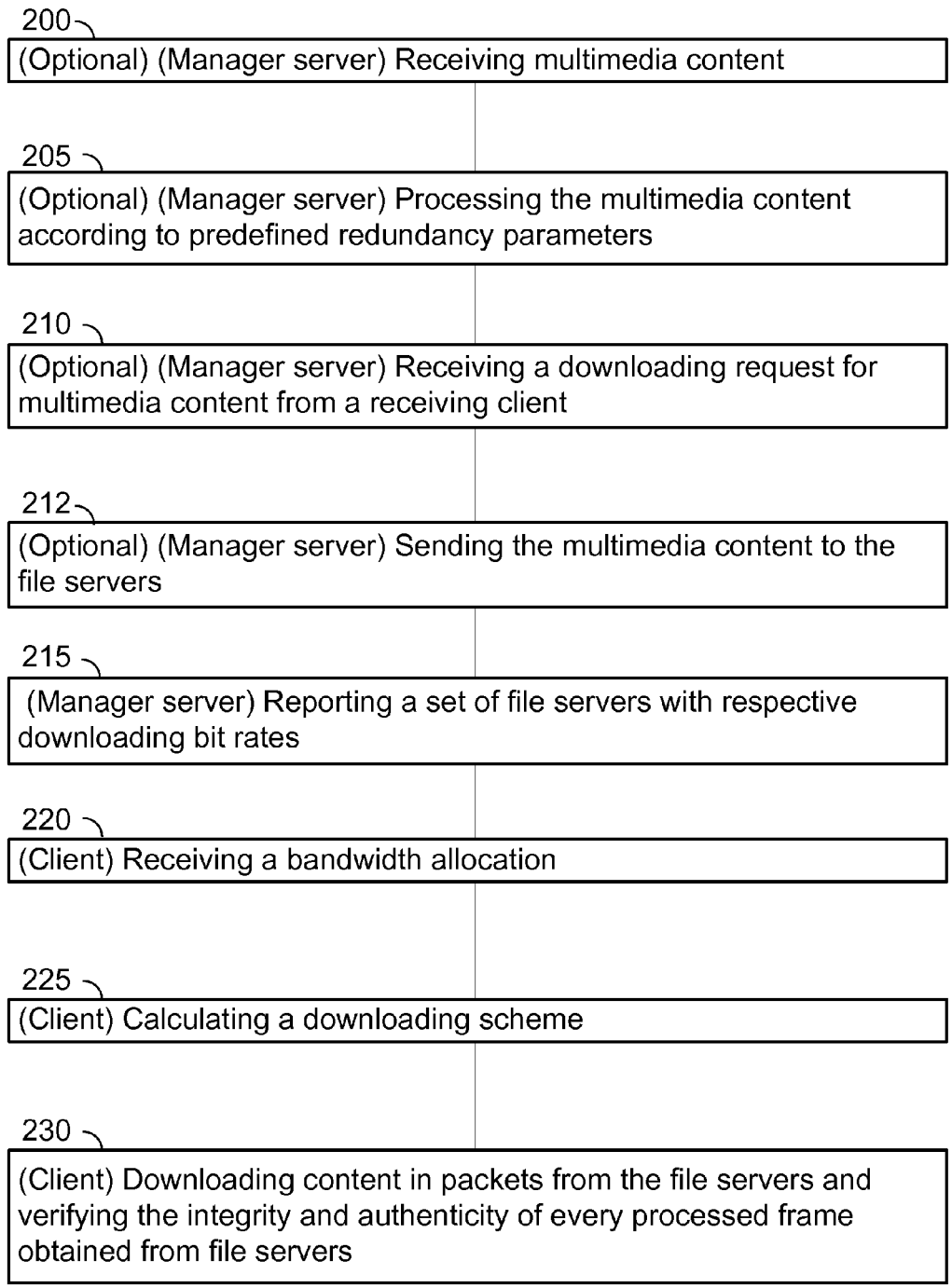
FIGS. 2, 3 and 4 are high level flowcharts illustrating a computer implemented method of transferring multimedia content comprising frames from a content server to a receiving client, according to some embodiments of the invention.
Figure 3:
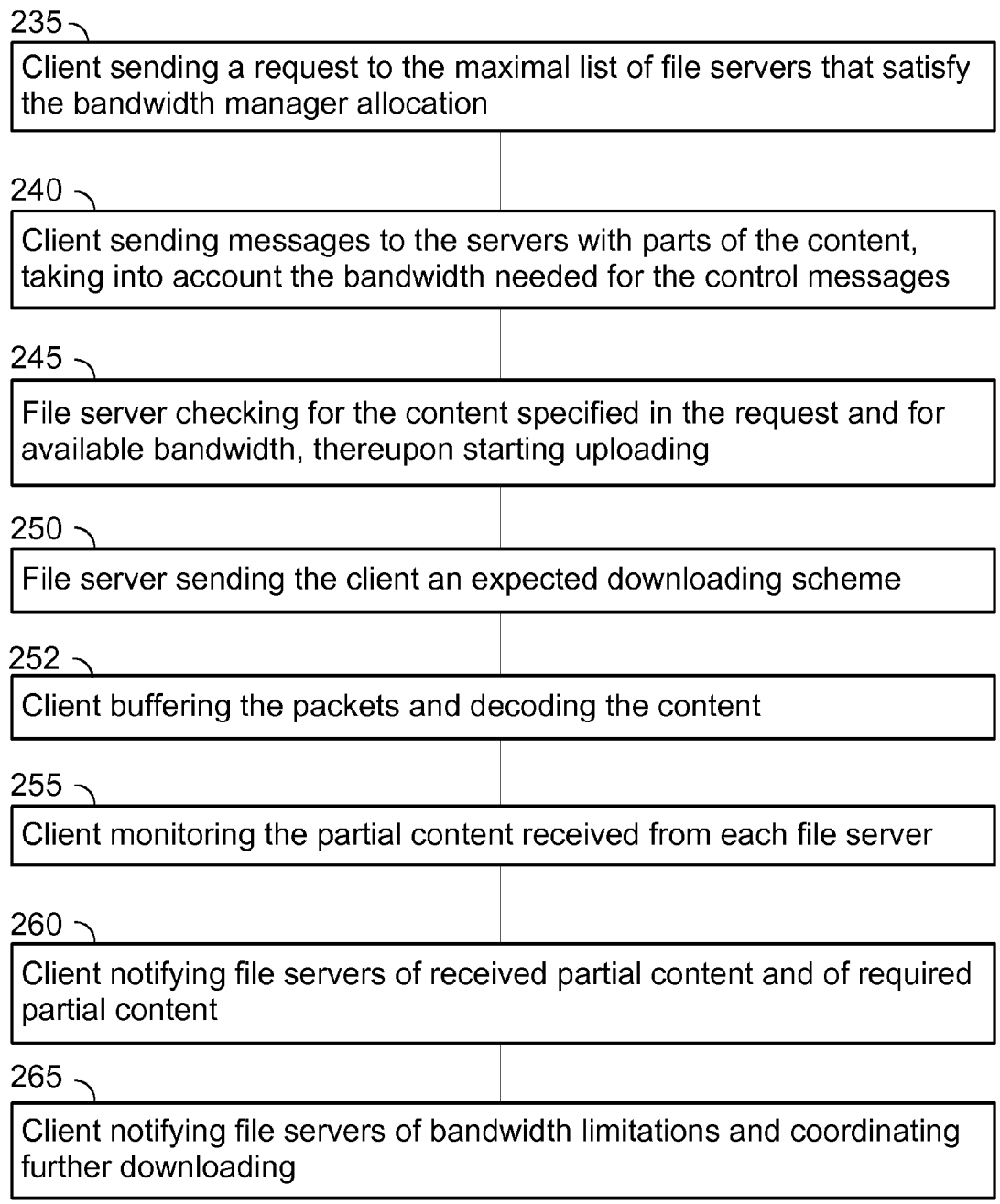
Figure 4:
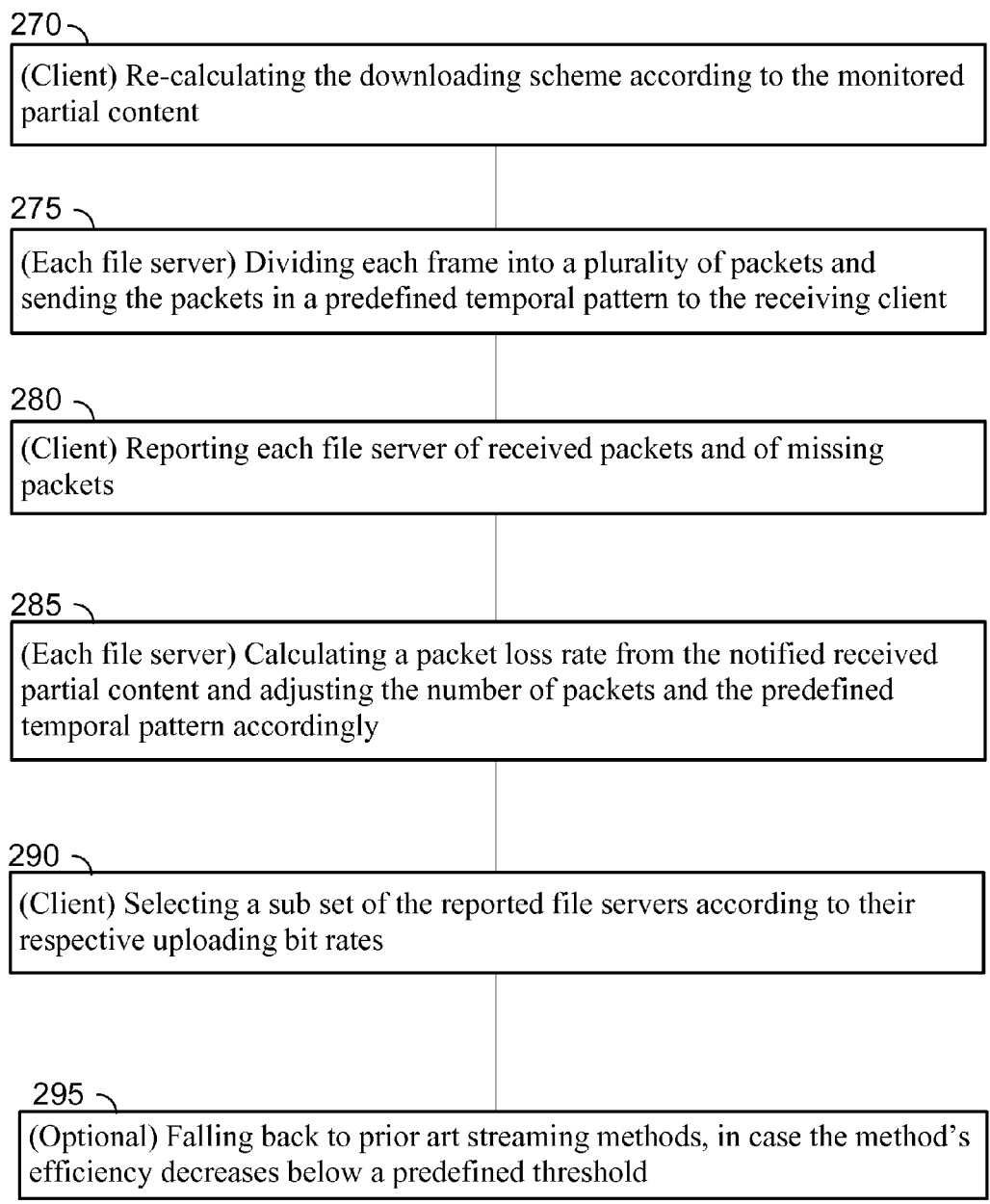

FIGS. 2, 3 and 4 are high level flowcharts illustrating a computer implemented method of transferring multimedia content comprising frames from content server 130 to receiving client 110, according to some embodiments of the invention. The computer implemented method comprises the following stages.

(Optionally) Management server 100 receiving the multimedia content from content server 130 (stage 200). Initial bytes of a file request may be downloaded from the customer's origin servers or Content Delivery Network (CDN).

(Optionally) Management server 100 processing the multimedia content according to predefined redundancy parameters (stage 205). For example, the multimedia content may be encoded using error correction code (implementing forward error correction) and stretched (i.e., redundancy is added in the form of parity blocks) several times. Additionally, it may be fragmented and spread among many unreliable file servers (such as end users' computers). The data is assumed to be of "Long tail" nature and proactively pushing it to file servers 120 increases its availability. The purposes of processing the multimedia content (stage 205) are: (i) assuring the availability of the data in a minimum number of file servers required 120 but without creating massive replication of the data in the network; (ii) allowing for correction of packet loss; and (iii) ensuring smooth load balancing between file servers 120 and replacement of file servers 120 during the streaming session. The coordination of all file servers 120 is driven by the receiver of the data, receiving client 110.

(Optionally) Management server 100 receiving a downloading request for the multimedia content from receiving client 110 (stage 210), e.g., via a local http proxy.

(Optionally) Management server 100 sending the multimedia content to file servers 120 (stage 212), e.g., similar to seeding in peer to peer networks.

Management server 100 reporting a plurality of file servers 120 with respective uploading bit rates (stage 215), e.g., upon receiving a request from receiving client 110. The report may comprise a list of file servers 120, each with specified parts of the multimedia content and respective bit rate for downloading these parts. The report may further comprise information about the availability and bandwidth of each file server 120.

Receiving client 110 receiving a bandwidth allocation (stage 220), e.g., from bandwidth manager 141. Receiving client 110 may ask bandwidth manager 141 for a bandwidth allocation based on the file bit rate and its own download limits. The bandwidth requested may be about 30% higher than the actual file bit rate in order to allow for packet loss. Since there may be several simultaneous sessions, bandwidth managers 141, 142 may monitor the total upload and download bandwidth consumed by the sessions.

Bandwidth managers 141, 142 may decide what the optimal bandwidth is and may further decide to stop a running session (e.g., a session storing content) in order to make room for a more important session (e.g., a session of streaming content). The end result is that the receiving client session receives an allocated bandwidth (e.g., a maximal and a minimal bandwidth).

Receiving client 110 calculating a downloading scheme (stage 225), in relation to the reported servers 120 with respective uploading bit rates (stage 215). The calculation (stage 225) may comprise the maximum and minimum number, and the identity, of file servers 120 that receiving client 110 may download from at the given bandwidth allocation (stage 220). The downloading scheme may comprise a set of network paths between receiving client 110 and file servers 120 and corresponding bandwidths and priorities. If receiving client 110 does not receive the bandwidth it expects, it may inform file servers 120 thereof, and change the downloading scheme periodically throughout the session.

Receiving client 110 downloading content in packets from file servers 120 and verifying the integrity and authenticity of every processed frame (group of packets) obtained from file servers 120 (stage 230). This stage may comprise the following stages.

Receiving client 110 sending a request to file servers 120 that satisfies the bandwidth allocation (stage 235), for example to a maximal number of file servers 120 that satisfy the bandwidth allocation.

Receiving client 110 sending messages to file servers 120 with request for designated parts of the content (stage 240). Receiving client 110 may take into account the bandwidth needed for control messages.

Each file server 120 checking for the content specified in the request and for available bandwidth, thereupon starting uploading (stage 245). For example, each file server 120 may check whether it has the content stored and consults respective bandwidth manager 142 if it can satisfy the request (file servers that are contacted are known to have parts of the file, therefore the only way a file part that is asked for is missing is if between the last maintenance time and the request time the file was deleted or manipulated). Content may be sent to receiving client 110 in blocks, frame by frame at the allowed rate. The rate may be quantized to 1 KB/sec units which are about one data packet/sec.

File server 120 sending receiving client 110 an expected downloading scheme (stage 250) in relation e.g., to its available bandwidth as checked with bandwidth manager 142. If bandwidth manager 142 does not allow the minimum requested bandwidth file server 120 sends a reject flag in a response message. The expected downloading scheme may comprise a list of expected blocks to be transmitted at the maximum speed at the beginning of each sending interval (1 second) and waiting periods between frames. The length of the waiting period may be approximately the sending interval and may be at least one enough to allow propagation of the packet in high delay (e.g., one second).

Receiving client 110 buffering the packets and decoding the content (stage 252) and receiving client 110 monitoring the partial content received from each file server 120 (stage 255) in relation to the downloading scheme (stage 250) (e.g., the number of blocks it received from each file server 120). In addition, receiving client 110 notifying file servers 120 of received partial content and of required partial content (stage 260). As receiving client 110 knows the rate at which each file server 120 sends packets (the downloading scheme), it may estimate the delay and packet loss for the specific stream. Receiving client 110 sends file servers 120 the expected block numbers they should transmit in each frame and in addition which extra block numbers they should transmit if content requests are lost due to communication problems. For example, in such case file server 120 may send a list of extra packets at the end of the interval at maximum speed and continue to transfer another predefined part of the content. The actions of file server 120 in cases of communication lost may also be part of the downloading scheme. Receiving client 110 may further notify file servers 120 of bandwidth limitations and coordinating of further downloading (stage 265). Receiving client 110 may request the content frame by frame from file servers 120. Receiving client 110 may requests parts of the content according to a predefined order of parts, and may contain information relating to downloaded content from other file servers 120. Content is decoded by receiving client 110 as predefined parts arrive at the server.

According to some embodiments of the invention, the computer implemented method may further comprise the flowing stages, as illustrated in FIG. 4: the receiving client re-calculating the downloading scheme according to the monitored partial content (stage 270); each file server dividing each frame into a plurality of packets and sending the packets in a predefined temporal pattern to the receiving client (stage 275); notifying the file servers of received partial content (stage 260) comprising reporting each file server of received packets and of missing packets (stage 280); each file server calculating a packet loss rate from the notified received partial content and adjusting the number of packets and the predefined temporal pattern accordingly (stage 285); and receiving client calculating a downloading scheme (stage 225) comprising the receiving client selecting a sub set of the reported file servers according to their respective uploading bit rates (stage 290).

The following section describes how receiving client 110 decides what is the required bandwidth it sends to each sub stream from each file server 120, and how to adjust it during the session (stage 225), according to some embodiments of the invention. The following notation is used: D—Data frame size; S—Sliced frame size; $F_{br}$—File (content) bit rate; $C_{br}$—Receiving client maximal allowed bit rate; $1^i$—the $i^{th}$ stream packet loss rate; $N_{active}$—number of active nodes (file servers 120); and $N_{extra}$—number of extra nodes (file servers 120).

Each file server 120 in the list received (stage 215) contains sliced frames of all frames of the original content. Each sliced frame has a minimum size of 2 and a maximum size of several tens of blocks, relating to the bit rate (e.g., 35 blocks for 4.0 Mbps; 21-22 for 2.5 Mbps; 17-18 for 2.0 Mbps; 13 for 1.5 Mbps; 7 for 800 Kbps; and 3-4 for 400 Kbps). The actual size of a sliced frame is dependent on the file bit rate and the number of file servers storing the file Receiving client 110 scheduler knows the file parameters ($F_{br}$) and its own maximum allowed download bit rate $C_{br}$ so it is taking min (Cbr, $1.3 \cdot F_{br}$) as the required rate. The scheduler then chooses from the list it received, a sub list of file servers 120 that can satisfy the required bit rate. If the scheduler cannot meet the requirement it redirects the download to the fallback method. In such a situation it is still possible if there is enough download bandwidth to fetch media frames from the Peer to Peer (P2P) network in a reverse order i.e., from the last to first at a lower rate. This will at least ensure that even in fallback situations some of the stuff is brought from the P2P network.

The StartStream message (stage 235) tells each file server 120 to send $D/N_{active}$ blocks and then wait up to 1 second and if necessary (when no NextFrame message is received, stage 255), and them send all its remaining packets of the sliced frame. Receiving client 110 keeps track of the amount of blocks arriving from each stream and their usefulness (a block belonging to a certain data frame arriving after it has been decoded is not useful). The next messages, i.e., GetNextFrame messages will adjust the amount of extra blocks to min ($2 \cdot 1^i$, $S-D/N_{active}$). The packet loss can be calculated as a moving average or some other filter that will smooth the fluctuations in packet loss from frame to frame.

According to some embodiments of the invention, receiving client 110 may report back to file server 120 (through the GetNextFrame message) the amount of packet loss its stream suffers. In this way, bandwidth managers 141 on the uploading side can deduce the cause of the packet loss and act accordingly. For example: if all uploading streams of file server 120 report extreme packet loss at the same time the problem is probably with file server 120 and there is no point in pushing more packets into any of the streams. If only one stream out of several is suffering high loss the problem is probably with the route to that file server 120 and bandwidth manager 142 may decide to stop serving receiving client 110 and make bandwidth manager 142 available to other receiving clients 110.

If one of the streams suffers a high packet loss or file server 120 has crashed or for some reason terminated the session, receiving client 110 can ask one or more of file servers 120 that were queried (stage 235, i.e., replied to StreamQuery message) to start sending enough packets so as to complete the original stream. Receiving client 110 can try and complete the missing packets from queried file servers 120 if the play buffer is full enough, otherwise it should use the fallback method. If file server 120 stops sending packets all together, a queried file server/s 120 (if they exist) may replace it. If a "dead" file server 120 starts sending packets again it will be sent a StreamStop message (stage 265).

According to some embodiments of the invention, there are two procedures that differ in their time scale. The first is the check that is done at about the middle of the 1 sec interval in which receiving client 110 is checking how many packets are missing to complete a frame and sends a QuickAssist message to file servers 120 to send an amount of blocks equal to the missing amount. The other procedure is done on a larger scale (about every few seconds) checks what is the total bandwidth reported by active (non queried) file servers 120. If this total number is less than required (which can happen say during a streaming of a large file) bandwidth manager 141 tries to add active servers from the pool of queried file servers 120 (by sending it a replace stream message). In this case the queried file server 120 may become an active file server 120 as long as respective bandwidth manager 142 allows it.

According to some embodiments of the invention, the streaming protocol fulfils the following requirements. (1) Minimize or preferably eliminate completely, buffering/pauses in playback. In other words the data should arrive at receiving client 110 at a speed that at the minimum fits the media bit rate. (2) Minimize time to first byte—i.e. minimize the time it takes to receive the first useful frame of the video. (3) The streaming performance should not be worse than the average infrastructure based CDN performance.

The inherent delays caused by the network address translation (NAT) traversal process may be overcome in the future by the use of IPV6 (Internet Protocol version 6). Using IPV4 (Internet Protocol version 4), in some cases it might be possible to be comparable or maybe even faster, but in cases where the initiating message has to go through a relay the time to first byte will be longer than the conventional time. It is still a main goal of the protocol to minimize the time to first byte as much as possible, and if not possible, enable fetching initial bytes from a fallback source such as servers of a CDN while retrieving the majority of the data from P2P nodes thereafter.

There is a certain overhead in the bandwidth usage that is caused by the fact that it takes a finite amount of time to notify file servers 120 that a frame has been decoded and they can now move to send blocks from the next frame. This delay causes blocks (packets) that belong to a certain frame to arrive at receiving client 110 after that frame has been decoded at which point this point such blocks are not useful to receiving client 110. This overhead is minimized in two ways: first, because of packet loss the overhead is necessary to prevent retransmissions so in fact not all the overhead is real overhead; and second, by the constant packet loss rate calculation that receiving client 110 keeps for each file server 120. This enables receiving client 110 to predict the required overhead so that it is as close as possible to the real packet loss and ask the server to send an amount of packets which is as close as possible to the one needed to handle the real packet loss.

According to some embodiments of the invention, the systems and methods may further comprise an optional fallback to prior art streaming methods, in case the efficiency of the disclosed methods decreases below a predefined threshold (stage 295). This option ensures that the systems and methods perform at least as well as prior art streaming methods.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A computer implemented method of transferring multimedia content comprising frames from a content server to a receiving client, comprising:
   receiving a downloading request for the multimedia content from the receiving client;
   reporting a plurality of file servers comprising a plurality of seeded servers having respective uploading bit rates;
   the client receiving a bandwidth allocation, wherein the plurality seeded servers comprise a peer to peer network, such that each seeded server is provided with designated parts of the multimedia content;
   calculating, via the receiving client, a downloading scheme, the downloading scheme comprising a set of network paths to the file servers and corresponding bandwidths and priorities; and
   downloading, via the receiving client, content in packets from the seeded servers and verifying an integrity and authenticity of every processed frame obtained from seeded servers,
   wherein the downloading scheme further includes a download bit rate which is specific for each one of the files, wherein the specific download bit rate is calculated by the receiving client as a minimum of: a bit rate based on parameters the file and a maximum download bit rate allowed for the receiving client.

2. The computer implemented method of claim 1, wherein the downloading comprises:
   sending a request to the plurality of file servers that satisfy the bandwidth allocation;
   sending messages to the file servers with designated parts of the content;
   checking, via each file server, for the content specified in the request and for available bandwidth, thereupon starting uploading;
   sending, via each file server, to the receiving client an expected downloading scheme;
   monitoring the partial content received from each file server;
   notifying the file servers of received partial content and of required partial content; and
   notifying the file servers of bandwidth limitations and coordinating of further downloading.

3. The computer implemented method of claim 2, wherein the sending messages further comprises taking into account a bandwidth needed for control messages.

4. The computer implemented method of claim 2, wherein the receiving client downloading content in packets further comprises the receiving client buffering the packets and decoding the content.

5. The computer implemented method of claim 2, further comprising re-calculating, via the receiving client, the downloading scheme according to the monitored partial content.

6. The computer implemented method of claim 2, further comprising dividing, via each file server, each frame into a plurality of packets and sending the packets in a predefined temporal pattern to the receiving client.

7. The computer implemented method of claim 6, wherein the notifying file servers of received partial content comprises reporting each file server of received packets and of missing packets.

8. The computer implemented method of claim 6, further comprising calculating, via each file server, a packet loss rate from the notified received partial content and adjusting the number of packets and the predefined temporal pattern accordingly.

9. The computer implemented method of claim 1, wherein the calculating a downloading scheme comprises the receiving client selecting a sub set of the reported file servers according to their respective uploading bit rates.

10. The computer implemented method of claim 1, further comprising:
    receiving the multimedia content from the content server;
    processing the multimedia content according to predefined redundancy parameters; and
    sending the multimedia content to the file servers.

11. The computer implemented method of claim 5, wherein the predefined redundancy parameters comprise error correction code implementing forward error correction.

12. A data processing system for transferring multimedia content comprising frames from a content server to a receiving client, comprising:
    a management server;
    a bandwidth manager associated with the receiving client; and
    a plurality of file servers comprising a plurality of seeded servers, each with an associated bandwidth manager, wherein the plurality seeded servers comprise a peer to peer network, such that each seeded server is provided with designated parts of the multimedia content;
    wherein the content server, the management server, the receiving client and the plurality of seeded servers are connected via at least one communication link,
    wherein the management server is arranged to report a plurality of seeded servers with respective uploading bit rates,
    wherein the bandwidth managers are arranged to allocate bandwidths at file servers to the receiving client in relation to the reported seeded servers with respective uploading bit rates,
    wherein the receiving client is arranged to:
    calculate a downloading scheme;
    download the multimedia content in packets from the seeded servers; and verify the integrity and authenticity of every processed frame obtained from the seeded servers, and wherein the downloading scheme comprises a set of network paths to the seeded servers and corresponding bandwidths and priorities, wherein the downloading scheme further includes a download bit rate which is specific for each one of the files, wherein the specific download bit rate is calculated by the receiving client as a minimum of: a bit rate based on parameters the file and a maximum download bit rate allowed for the receiving client.

13. The data processing system of claim 12, wherein the bandwidth manager of the receiving client is further arranged to:

send a request to the plurality of file servers that satisfy the bandwidth allocation; and send messages to the file servers with designated parts of the content, wherein each file server is arranged to:
check for the content specified in the request and for available bandwidth;
to start uploading thereupon; and
to send the receiving client an expected downloading scheme, and wherein the bandwidth manager of the receiving client is further arranged to:
monitor the partial content received from each file server;
notify the file servers of received partial content and of required partial content;
notify the file servers of bandwidth limitations; and
coordinate further downloading.

14. The data processing system of claim 13, wherein the bandwidth manager of the receiving client is further arranged to re-calculate the downloading scheme according to the monitored partial content.

15. The data processing system of claim 13, wherein the bandwidth manager of each file server is arranged to calculate a packet loss rate from the notified received partial content and to adjust the number of packets and the predefined temporal pattern accordingly.

16. The data processing system of claim 12, wherein each file server is further arranged to divide each frame into a plurality of packets and to send the packets in a predefined temporal pattern to the receiving client.

17. The data processing system of claim 12, wherein the bandwidth manager of the receiving client is further arranged to report each file server of received packets and of missing packets.

18. The data processing system of claim 12, wherein the bandwidth manager of the receiving client is further arranged to select a sub set of the reported file servers according to their respective uploading bit rates.

19. The data processing system of claim 12, wherein the management server is further arranged to:
receive the multimedia content from the content server;
process the multimedia content according to predefined redundancy parameters;
receive a downloading request for the multimedia content from the receiving client; and
send the multimedia content to the file servers.

20. The data processing system of claim 19, wherein the predefined redundancy parameters comprise error correction code implementing forward error correction.

\* \* \* \* \*